United States Patent Office 3,510,529
Patented May 5, 1970

3,510,529
METHOD FOR THE PRODUCTION OF PENTA-CHLOROPHENOL AND OF INTERMEDIATES THEREFOR
Adrianus Van Es, Hengelo, Netherlands, assignor to N.V. Koninklijke Nederlandsche Zoutindustrie, Hengelo, Netherlands, a Dutch company
No Drawing. Filed May 9, 1967, Ser. No. 637,094
Int. Cl. C07c 39/36, 39/32
U.S. Cl. 260—623
1 Claim

ABSTRACT OF THE DISCLOSURE

Pentachlorophenol is produced by treating phenol or a lower chlorinated chlorophenol with a hydrochloric acid and/or chlorine and an oxygen-containing gas in the presence of an oxychlorination catalyst.

The invention relates to a method for the production of pentachlorophenol and of intermediates therefor.

Pentachlorophenol is a known compound which because of its biocidal activity has found use in several compositions for combatting noxious organisms.

Pentachlorophenol is usually prepared either by treating phenol or a lower chlorinated chlorophenol with chlorine, or by chlorination of benzene into hexachlorobenzene followed by heating a mixture of hexachlorobenzene and sodium hydroxide under a superatmospheric pressure.

It is an object of the present invention to provide an improved method for the production of pentachlorophenol and of intermediates thereof.

In accordance with the present invention it has been found that pentachlorophenol can be obtained in a good yield by subjecting phenol or a lower chlorinated chlorophenol to an oxychlorination reaction. The term "oxychlorination reaction" as used herein means a reaction of an organic starting material with a mixture of hydrochloric acid and/or chlorine and an oxygen containing gas in the presence of an oxychlorination catalyst.

It has been found that if phenol is subjected to such an oxychlorination reaction, well-known in the chlorination of hydrocarbons, and if the reaction temperature, which should be chosen above 100° C. to ensure a reasonable reaction rate, is kept below 350° C., very few side products and in particular surprisingly low amounts of oxydation products of phenol and/or chlorophenols are formed.

Thus the invention may briefly be described as a method for producing pentachlorophenol and intermediates therefor characterized in that phenol or lower chlorinated chlorophenol is treated with a mixture of hydrochloric acid and/or chlorine and an oxygen containing gas at a temperature between 100 and 350° C. in the presence of an oxychlorination catalyst.

The oxychlorination catalysts which can be used in the method according to the invention comprise such catalysts which are known to be suitable for the oxychlorination of hydrocarbons. For example, a normal metal halide catalyst for oxychlorination reactions can be used. Such a catalyst comprises a halide of copper, chromium or iron, eventually combined with a halide of sodium or potassium. Preferably, chlorides are used as metal halides which chlorides are supported on silica, alumina, diatomite or pumice. When desired, oxides and/or salts of alkaline earth metals, rare earth metals and/or noble metals may also be added to the catalyst.

The oxygen-containing gas may be elemental oxygen or oxygen mixed with nitrogen, argon or neon. It has been found that good results can also be obtained by using air as the oxygen-containing gas.

Preferably, the reaction is carried out by first mixing a mixture of hydrochloric acid and an oxygen containing gas with an amount of the vapour of phenol or of a partly chlorinated phenol, for instance by passing hydrochloric acid and/or oxygen-containing gas over or through the heated phenol or lower chlorinated phenol, and then contacting the whole gaseous reaction mixture with the catalyst by passing this reaction mixture through or over the catalyst material. The catalyst material can be provided and used in any form known in the art of the oxychlorination of hydrocarbons and thus, for instance, the catalyst can as well be applied in the form of a fluidized bed or a fixed bed.

Preferably, the catalyst mass is applied, either in the form of a power that is fluidized by the gaseous reaction mixture or in the form of a fixed mass of granules or pellets, in an elongated tube. Hereby the reaction time is fixed by the linear rate of velocity of the gas mixture in the tube and the length of the catalyst column. If needed, a number of columns can be arranged in series.

It has been found that if the temperature in the reaction zone is kept below 220° C., even in the case that pentachlorophenol is kept for a long time in the reaction zone, no significant further chlorination and/or decomposition of pentachlorophenol occurs, on the other hand, the rate of the reaction to pentachlorophenol is rather low at temperatures below 200° C.

Accordingly, in a suitable manner to carry out the reaction of the invention the reaction temperature is kept between 250° and 350° C. and the length of the catalyst column and the velocity of the gas are selected so that an optimal yield of pentachlorophenol and a minimal decomposition are obtained.

It also has been found that if the reaction is started with phenol a rather rapid chlorination to 2,4,6-trichlorophenol occurs. At reaction temperatures lower than 250° C. it is very well possible to obtain 2,4,6-trichlorophenol as substantially the only chlorination reaction product. Accordingly, the reaction of the invention can be carried out in such a way that first in one or more separate reaction zones at a temperature lower than 250° C. the oxychlorination of phenol to 2,4,6-trichlorophenol is carried out and next the trichlorophenol, mixed with hydrochloric acid and an oxygen-containing gas, is passed through one or more catalyst beds at a higher temperature.

It will be clear that it is not necessary to use a 2,4,6-trichlorophenol that is prepared from phenol in the above manner. As a matter of fact, one may also start the reaction with 2,4,5-trichlorophenol, and lower chlorinated phenols such as 2- or 4-chlorophenol or 2,4- or 2,5-dichlorophenol are suitable starting materials in the method according to the invention too.

EXAMPLE 1

In a fluidized bed of an oxychlorination catalyst comprising a CuCl$_2$/KCl mixture (molar ratio 2:3) supported on a silica carrier (90 parts by weight of silica and 10 parts by weight of the salt mixture) phenol was chlorinated at a temperature of 295° C. in a gas mixture consisting of 1 vol. of phenol, 20 vol. of HCl and 17.5 vol. of air at a residence time of 18 seconds in the bed.

The composition of the product was (percentages by weight):

12% 2,4,6-trichlorophenol
2% 2,3,4,6-tetrachlorophenol
80% pentachlorophenol
6% side products (a.o., chloranil, hexachlorobenzene, octachlorodibenzo-p-dioxine).

EXAMPLE 2

In the manner described in Example 1 phenol was chlorinated with a residence time of 4 seconds in the catalyst bed and a product was obtained consisting of (percentages by weight):

6% 2,4-dichlorophenol (with very little 2,6-dichlorophenol)
92% 2,4,6-trichlorophenol
1% 2,3,4,6-tetrachlorophenol
1% pentachlorophenol.

EXAMPLE 3

By using the same catalyst as in the Examples 1 and 2 the chlorination was carried out in a gas mixture consisting of 1 vol. of phenol, 15 vol. of HCl and 12.5 vol. of air, at a temperature of 220° C. and a residence time in the catalyst bed of 4 seconds.

The product was composed of (percentages by weight):

17% dichlorophenol (mainly 2,4-dichlorophenol)
80% 2,4,6-trichlorophenol
3% pentachlorophenol.

This invention may be variously modified and embodied within the scope of the subjoined claim.

What is claimed is:

1. The method of halogenating a material selected from the group consisting of phenol and chlorophenols which comprises, reacting said material with a mixture consisting essentially of hydrochloric acid and an oxygen containing gas at temperature in the range of about 100° C. to 350° C. in the presence of an oxychlorination catalyst selected from the group consisting of chlorides of copper, chromium and iron combined with a chloride of a metal selected from the group consisting of sodium and potassium.

References Cited

UNITED STATES PATENTS

| 2,947,790 | 8/1960 | Shelton et al. | 260—623 |
| 2,131,259 | 9/1938 | Stoesser | 260—623 |

OTHER REFERENCES

Ohta et al.: "Appl. Chem. J.," vol. 8i54 (1958).
Groggins: "Unit Processes in Organic Synthesis," pp. 205–206, 265.

BERNARD HELFIN, Primary Examiner

W. B. LONE, Assistant Examiner